United States Patent
Marupaduga et al.

(10) Patent No.: US 10,075,851 B1
(45) Date of Patent: Sep. 11, 2018

(54) DYNAMIC VARIATION OF BANDWIDTH OF IN-BAND CARRIER BASED ON QUANTITY OF CONNECTED-MODE DEVICES SERVED ON HOST CARRIER

(71) Applicant: Sprint Spectrum L.P., Overland Park, KS (US)

(72) Inventors: Sreekar Marupaduga, Overland Park, KS (US); Bryan T. Barbee, Olathe, KS (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/630,518

(22) Filed: Jun. 22, 2017

(51) Int. Cl.
| | | |
|---|---|---|
| *H04W 88/10* | (2009.01) | |
| *H04W 16/14* | (2009.01) | |
| *H04W 16/10* | (2009.01) | |
| *H04L 5/14* | (2006.01) | |
| *H04L 5/00* | (2006.01) | |

(52) U.S. Cl.
CPC ........... *H04W 16/14* (2013.01); *H04L 5/0092* (2013.01); *H04L 5/1469* (2013.01); *H04W 16/10* (2013.01); *H04W 88/10* (2013.01)

(58) Field of Classification Search
CPC ..... H04W 16/14; H04W 16/10; H04W 88/10; H04L 5/0092; H04L 5/1469
See application file for complete search history.

(56) References Cited

U.S. PATENT DOCUMENTS

| | | | |
|---|---|---|---|
| 7,769,073 B2 | 8/2010 | Yarkosky | |
| 9,363,271 B1 | 7/2016 | Puliatti et al. | |
| 9,451,554 B1 | 9/2016 | Singh et al. | |
| 9,736,699 B1 | 8/2017 | Rao | |
| 2007/0143486 A1* | 6/2007 | Kang | H04L 29/12311 709/229 |
| 2013/0309971 A1 | 11/2013 | Kiukkonen et al. | |
| 2014/0010086 A1 | 1/2014 | Etemad et al. | |
| 2014/0161016 A1* | 6/2014 | Morioka | H04L 1/1861 370/312 |
| 2016/0142911 A1* | 5/2016 | Kreiner | H04W 48/18 370/328 |
| 2017/0019900 A1 | 1/2017 | McNamara et al. | |

OTHER PUBLICATIONS

U.S. Appl. No. 15/434,451, filed Feb. 16, 2017.
U.S. Appl. No. 15/374,439, filed Dec. 19, 2016.

* cited by examiner

*Primary Examiner* — Chuong A Ngo

(57) ABSTRACT

A base station provides service on a host carrier, the host carrier having a host-carrier frequency range that defines a host-carrier bandwidth. Further, the base station provides service on a guest carrier concurrently with the base station providing service on the host carrier, the guest carrier having a guest-carrier frequency range that is defined fully within and as a portion of the host-carrier frequency range and that defines a guest-carrier bandwidth narrower than the host-carrier bandwidth. And the base station dynamically varies the guest-carrier bandwidth based at least on variation in quantity of client devices connected with the base station on the host carrier.

20 Claims, 6 Drawing Sheets

DYNAMIC VARIATION OF BANDWIDTH OF IN-BAND CARRIER BASED ON QUANTITY OF CONNECTED-MODE DEVICES SERVED ON HOST CARRIER

BACKGROUND

A typical wireless communication system includes a number of base stations each radiating to provide coverage in which to serve wireless client devices (WCDs) such as cell phones, tablet computers, tracking devices, embedded wireless modules, and other wirelessly equipped devices. In turn, each base station may sit as a node on a core access network that includes entities such as a network controller and a gateway system that provides connectivity with an external transport network such as the Internet. With this arrangement, a WCD within coverage of the system may engage in air interface communication with a base station and may thereby communicate via the base station with various remote network entities or with other WCDs served by the base station.

Such a system may operate in accordance with a particular air interface protocol, examples of which include, without limitation, Long Term Evolution (using Orthogonal Frequency Division Multiple Access (OFDMA) and Single Carrier Frequency Division Multiple Access (SC-FDMA)), Code Division Multiple Access (CDMA) (e.g., 1xRTT and 1xEV-DO), Global System for Mobile Communications (GSM), IEEE 802.11 (WIFI), BLUETOOTH, and others.

In accordance with the air interface protocol, a base station may provide service on one or more carriers, each spanning particular radio-frequency on which communications can flow wirelessly between the base station and WCDs. Such a carrier could be structured to provide a downlink for carrying communications from the base station to WCDs and an uplink for carrying communications from WCDs to the base station. For instance, the carrier could be frequency division duplex (FDD), with separate frequency ranges provided respectively for downlink and uplink communication, or time division duplex (TDD), with a single frequency range being time division multiplexed between downlink and uplink use.

Through modulation or other means on the carrier, in accordance with the air interface protocol, the downlink and uplink could then be structured to define various channels for carrying communications between the base station and WCDs. For instance, the downlink could be structured to define (i) a downlink shared channel with resources allocable by the base station for carrying data from the base station to WCDs and (ii) downlink control channels with resources for carrying control signaling from the base station to WCDs. And the uplink could be structured to define (i) an uplink shared channels with resources allocable by the base station for carrying data from WCDs to the base station and (ii) uplink control channels with resources for carrying control signaling from WCDs to the base station.

OVERVIEW

A representative air interface protocol may support carriers that have specific frequency bandwidths (as the frequency ranges of the downlink and uplink using FDD carrier, or as the shared downlink/uplink frequency range using TDD). For example, LTE supports carriers that have bandwidths of 1.4 MHz, 3 MHz, 5 MHz, 10 MHz, 15 MHz, and 20 MHz (and may support wider bandwidths in some frequency bands). Thus, LTE base stations could be configured to provide service on one or more carriers each having one those supported LTE bandwidths. To facilitate this, a wireless service provider could acquire a license for radio frequency spectrum and could configure base stations to provide service on carriers of such bandwidths within the licensed spectrum.

For various reasons, however, a wireless service provider may face a scenario where one of its base stations is or will be configured to provide service on a carrier of particular bandwidth and where the service provider would like to have the base station also provide service on another carrier of a narrower bandwidth, but without the need to license or otherwise add more spectrum for that other carrier.

By way of example, a base station could be configured to provide service on a 20 MHz carrier, and the service provider may want to additionally configure the base station to provide service on a 5 MHz carrier, without the need to add 5 MHz of spectrum. This situation could arise, for instance, if the service provider would like to have the base station provide service on a 5 MHz carrier on behalf of another service provider (e.g., a mobile virtual network operator (MVNO)) and/or to have the base station provide such service for a special class of WCDs, such as Machine-Type-Communication (MTC) devices, but without the need to add 5 MHz of spectrum to the base station.

One way to address this scenario is to configure the narrower-bandwidth carrier as a guest carrier within the wider-bandwidth carrier. In the example above, for instance, a 5 MHz carrier could be defined within the 20 MHz carrier, and the base station could be configured to provide service concurrently on both the 20 MHz carrier (as a host carrier) and the 5 MHz carrier (as a guest carrier). With this arrangement, a portion of the host carrier's air interface resources would also be air interface resources of the guest carrier, but the base station could prioritize use of those resources for the guest carrier when needed or could otherwise manage the resources.

In practice, the host carrier and guest carrier could each be structured to include the shared and control channels prescribed by an applicable air interface protocol (though the base station could alternatively use different air interface protocols and thus different structures on the guest carrier than on the host carrier). For instance, each carrier could define its own shared channel and its own control channels.

Further, because the guest carrier will occupy a portion of the host carrier, the guest carrier and base station could be configured in a manner that helps avoid or minimize conflict between the two carriers but that allows the carriers to share use of certain resources. For example, the guest carrier could be defined within the host carrier at a position that is selected to avoid overlap of certain key host-carrier control channels with corresponding key guest-carrier control channels but that allows overlap of one or more other particular control channels. And the base station could be configured to avoid assignment of shared-channel resources on either carrier in a manner that would conflict with control-channel or shared-channel resource use on the other carrier. Other examples are possible as well.

In order for the guest carrier to provide sufficient resources to accommodate WCDs served on the guest carrier, it may be desirable for the guest carrier to span a relatively wide range of frequency. This could be particularly useful where the guest carrier might carry extensive communication. For instance, if the guest carrier is reserved for use by MTC devices, a relatively wide guest-carrier frequency range could be useful considering the expected proliferation of MTC devices and the corresponding expected growth in MTC communications.

On the other hand, as the base station serves WCDs on the host carrier, it could also be important to help ensure availability of resources on the host carrier for serving those WCDs. Therefore, it may be desirable for the guest carrier to occupy a relatively narrow portion of the host carriers bandwidth.

That said, there may be times when the base station is serving many WCDs on the host carrier and it would be useful to have the guest carrier occupy a narrower range of frequency within the host carrier, and there may be other times when the base station is serving relatively few if any WCDs on the host carrier and it would be fine to have the guest carrier occupy a wider range of frequency within the host carrier. It could therefore be useful to dynamically vary the bandwidth of the guest carrier within the host carrier based on a consideration of how many WCDs the base station serves on the host carrier.

Disclosed herein is a method and system along these lines. In accordance with the disclosure, the bandwidth of a guest carrier defined within a host carrier could be varied dynamically based at least on the number of WCDs connected with the base station on the host carrier. In particular, the base station that provides the host carrier and guest carrier could monitor how many WCDs have an established radio-link-layer connection (e.g., Radio Resource Connection) with the base station, and the base station could vary the bandwidth of the guest carrier based on that number. As the number of WCDs connected with the base station on the host carrier increases, the base station could reduce the bandwidth of the guest carrier so that the guest carrier would occupy a narrower portion of the host carrier's bandwidth. And as the number of WCDs connected on the host carrier decreases, the base station could increase the bandwidth of the guest carrier so that the guest carrier would occupy a wider portion of the host carrier's bandwidth.

Accordingly, in one respect, disclosed is a method for a base station to provide cellular wireless service on a guest carrier and a host carrier. In accordance with the method, the base station provides service on the host carrier, the host carrier having a host-carrier frequency range that defines a host-carrier bandwidth. Further, the base station provides service on the guest carrier concurrently with the base station providing service on the host carrier, the guest carrier having a guest-carrier frequency range that is defined fully within and as a portion of the host-carrier frequency range and that defines a guest-carrier bandwidth narrower than the host-carrier bandwidth. And the base station dynamically varies the guest-carrier bandwidth based at least on variation in a quantity of client devices connected with the base station on the host carrier.

In another respect, disclosed is a method of configuring an air interface for communication between a base station and wireless client devices, where the base station provides service on a host carrier, the host carrier spanning a host-carrier frequency range defining a host-carrier bandwidth. In accordance with the disclosure, the method includes configuring the air interface as a guest carrier within the host carrier, where the guest carrier and host carrier are time-synchronized with each other, where the guest carrier spans a guest-carrier frequency range defining a guest-carrier bandwidth, where the guest-carrier frequency range is fully within the host-carrier frequency range, and where the guest-carrier bandwidth is narrower than the host-carrier bandwidth. And the method includes dynamically varying the guest-carrier bandwidth based at least on variation in a quantity of wireless client devices connected with the base station on the host carrier.

Still further, in another respect, disclosed is a base station configured to provide service on a host carrier and on a guest carrier within the host carrier, where the host carrier has a host-carrier frequency range, and where the guest carrier has a guest-carrier frequency range that is narrower than the host-carrier frequency range and that occupies a portion of the host-carrier frequency range and is fully encompassed by the host-carrier frequency range. In accordance with the disclosure, the base station includes a wireless communication interface, comprising a radio and an antenna structure, configured to transmit and receive air interface communication on the host carrier and on the guest carrier. And the base station includes a controller configured to dynamically vary a bandwidth of the guest carrier within the host carrier based at least on variation in a quantity of wireless client devices connected with the base station on the host carrier.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
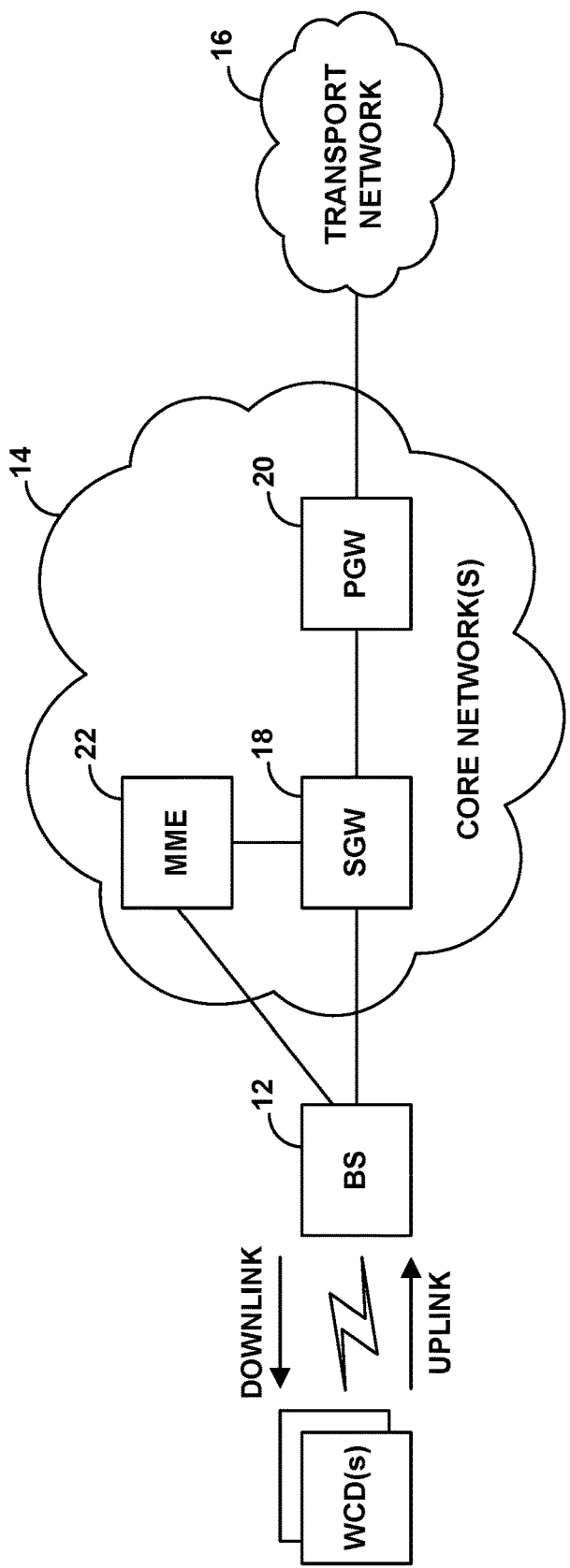
FIG. 1 is a simplified block diagram of an example LTE network.

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Referring to the drawings, as noted above, FIG. 1 is a simplified block diagram of an example LTE network. This network functions primarily to serve WCDs with wireless packet data communication service, including possibly voice-over-packet service, but may also provide other functions. As shown, the LTE network includes a representative LTE base station (evolved Node-B (eNodeB)) 12, which would have an antenna structure and associated equipment (e.g., baseband unit, radio, and amplifier) for providing a respective LTE coverage area in which to serve WCDs. This base station could take any of a variety of forms, such as a macro base station, a small cell base station, and/or a relay base station, among other possibilities. Likewise, the WCDs could take various forms, such as any of those noted above for instance.

As further shown, the base station has a communication interface with one or more core networks 14 each operated by a service provider or operator and defining a respective public land mobile network (PLMN), and each of which may provide connectivity with a transport network 16 such as the Internet. In an example arrangement, for instance, the base station could provide connectivity with a single operator's core network for a single PLMN and could be configured to serve WCDs that subscribe to service of that PLMN. And in another example arrangement, the base station could provide connectivity with two or more operators' core networks for separate, respective PLMNs and could be configured to serve WCDs that subscribe to service of any of those PLMNs. FIG. 1 depicts example components of an example core network. In particular, the example core network could include a serving gateway (SGW) 18, a packet-data-network gateway (PGW) 20, and a mobility management entity (MME) 22.

As noted above, a representative base station may provide service on one or more carriers, each defining a downlink and an uplink. For instance, the base station could provide service on an FDD carrier that defines separate downlink and uplink frequency ranges and/or on a TDD carrier that defines a frequency range time division multiplexed between downlink and uplink use. In either case, the carrier bandwidth could be one of the standard LTE bandwidths noted above or could be another designated bandwidth. Further, each carrier could be characterized by its center frequency and its bandwidth centered on that frequency.

In accordance with the LTE protocol, the air interface on the carrier is subdivided in the time domain and the frequency domain to define an array of resource elements for carrying modulated communications between the base station and WCDs. In particular, in the time domain, the air interface defines a continuum of 10-millisecond (ms) frames, each of which is divided into ten 1-ms subframes, and each subframe is then further divided into two 0.5-ms timeslots and fourteen 66.67-microsecond (μs) symbol time segments (or twelve symbol time segments if an extended cyclic prefix is used). And in the frequency domain, the carrier bandwidth is divided into 15-kHz subcarriers (as many as would fit within the carrier bandwidth). With this arrangement, the air interface on the carrier thus defines an array of resource elements each occupying a 15 kHz subcarrier and spanning a 66.67 μs symbol time segment, and the base station and WCDs can communicate with each other through modulation of data in these resource elements.

Further, LTE defines particular groupings of resource elements as physical resource blocks (PRBs). In the time domain, each PRB has a duration corresponding to one timeslot (i.e., 7 symbol time segments, over 0.5 ms). And in the frequency domain, each PRB spans 12 subcarriers (i.e., 180 kHz). Thus, across the carrier bandwidth in each subframe, the LTE air interface is divided into 12-subcarrier groups, and for every 12-subcarriers, there are two PRBs, one in each timeslot of the subframe. Depending on the carrier bandwidth, the LTE air interface thus supports a certain number of such PRBs across the carrier in each timeslot. For instance, a 5 MHz carrier supports 25 PRBs across its bandwidth, a 10 MHz carrier supports 50 PRBs across its bandwidth, and a 20 MHz carrier supports 100 PRBs across its bandwidth In addition, LTE designates certain resource elements on the downlink and uplink to be used for particular control channel or shared channel communications.

For instance, on the downlink, the first one, two or three symbol time segments per subframe (or per downlink subframe in TDD) across the carrier bandwidth generally define a downlink control region for carrying control signaling from the base station to WCDs. Within this control region, certain resource elements at the low-frequency end of the carrier bandwidth in the first symbol time segment per subframe are reserved to define a physical control format indicator channel (PCFICH) that specifies how many symbol time segments per subframe define the downlink control region, so that WCDs can determining the size of the control region. Further, the remainder of the control region then defines various other control channels, primarily a physical downlink control channel (PDCCH) for carrying scheduling directives and the like from the base station to the WCD.

Following the control region in time, the remaining eleven, twelve, or thirteen symbol time segments per downlink subframe across the carrier bandwidth then generally define a shared channel region or physical downlink shared channel (PDSCH) for carrying scheduled data communications from the base station to WCDs within designated resource blocks. In practice, when the base station is serving a WCD, the base station can transmit data to the WCD by scheduling particular PRBs in the PDSCH to carry the data, transmitting in the PDCCH a downlink control information (DCI) message, masked with an identifier of the WCD, that specifies the scheduled PRBs, and modulating the data in the resource elements of the designated PRBs. By searching through the control region (as defined by the PCFICH) per subframe, the WCD could thus find and read the DCI message to determine the PRBs that carry the data destined to the WCD, and the WCD could then demodulate the resource elements of those PRBs to obtain the data.

In addition, LTE reserves certain resource elements on the downlink for other purposes. For instance, certain resource elements distributed in a specific pattern throughout the carrier bandwidth per subframe (typically four resource elements distributed in each resource block, in locations within both the control channel region and the shared channel region), are reserved to carry a cell-specific reference signal that WCDs can measure as a basis to evaluate coverage strength. LTE defines three such reference-signal resource element patterns, and a given LTE cell on a given carrier can be set to use one of those three patterns.

Further, in the sixth and seventh symbol time segments of the first and sixth subframe of each frame, a group of 62 resource elements centered within the carrier bandwidth (thus within the 6 center PRBs) are reserved as synchronization channels, which carry primary and secondary carrier-synchronization signals that WCDs can detect as a basis to determine frame timing, cell identification, and reference-signal configuration. In practice, a WCD configured for LTE service could be provisioned or provided with a list of carriers on which the WCD can operate, designating each carrier by its center frequency and bandwidth for instance. Thus, when the WCD first powers on, the WCD could scan for and detect coverage on such a carrier and could scan for a primary synchronization signal on the carrier in order to determine the carrier frame timing, cell identification, and reference-signal configuration.

In particular, the WCD could read the 62 centrally located resource elements over time on the carrier until the WCD finds that those resource elements carry a primary synchronization signal of a predefined form or value. Given knowledge of the relative time position of that primary synchronization signal within a frame as noted above, the WCD could thereby learn the frame timing, so that the WCD can then read other downlink communications on the carrier. Further, based on the primary synchronization signal position, the WCD could also find the secondary synchronization signal and could compute the cell identification (physical cell identity (PCI)) as a function of those two signals' values. And the WCD could further determine which reference-signal pattern is used on the carrier, based on a modulo-3 function of the primary synchronization signal value (or of the PCI value), so that the WCD can then evaluate coverage strength.

Still further, in the eighth through eleventh symbol time segments of the first subframe per frame, a group of 72 resource elements centered within the carrier bandwidth (thus also within the 6 center PRBs) are reserved for use as a physical broadcast channel (PBCH) for carrying system information broadcast messages. These messages include, among other items, a Master Information Block (MIB) broadcast every 40 ms, which carries important operational parameters, such as the carrier's bandwidth (e.g., defined as how many PRBs-wide the carrier is, centered on the carriers' center frequency). Thus, in practice, once a WCD has determined frame timing, the WCD could read the MIB to determine the carrier's bandwidth and other important operational parameters.

On the uplink, on the other hand, certain PRBs at the low end and high end of the carrier bandwidth (e.g., the first two and last two, frequency wide) generally define an uplink control region, primarily as a physical uplink control channel (PUCCH), for carrying control signaling from WCDs to the base station. And the PRBs in between the low and high end PUCCH resource blocks generally define an uplink shared channel region, as a physical uplink shared channel (PUSCH), for carrying scheduled data communications from WCDs to the base station. In practice with this arrangement, when a WCD has data to transmit to the base station, the WCD could transmit a scheduling request in PUCCH resources. The base station could then schedule particular PRBs in the PUSCH to carry the data and transmit in the PDCCH a downlink control information (DCI) message, masked with an identifier of the WCD, that specifies the scheduled resource blocks. And the WCD could then modulate the data in the resource elements of the designated PRBs, for receipt by the base station.

In addition, the base station could reserve certain resource elements on the uplink for other purposes as well. For instance, through PBCH signaling or the like, the base station could designate particular groups of uplink resource elements to define a physical random access channel (PRACH) for carrying random access control signaling from WCDs to the base station, and the base station could designate other groups of uplink resource elements to carry WCD-specific reference signals (sounding reference signals) that the base station can use to evaluate WCD uplink timing and the like.

In operation, once a WCD has entered into base station coverage on a carrier such as this and has established frame timing and determined that coverage strength is sufficient, the WCD could engage in signaling with the base station and an associated core network to register for service. For instance, the WCD could read the PBCH to determine where the PRACH is located on the uplink, and the WCD could then transmit a random access signaling message to the base station on the PRACH and engage in further signaling with the base station to establish a radio-link-layer connection, or Radio Resource Control (RRC) connection, with the base station, effectively putting the WCD into an RRC connected mode of operation.

Through the WCD's established RRC connection with the base station, the WCD could then transmit an attach request, which the base station could forward to the MME for processing. And the MME could then coordinate establishment for the WCD of one or more bearers for carrying data between the WCD and the PGW, thus enabling the WCD to engage in communication on the transport network 16. Further, the base station could establish a context record for the WCD, identifying the WCD's established RRC connection with the base station and specifying bearer information and other service attributes for the WCD.

Once the WCD is so connected with the base station on a given carrier, the base station could then serve the WCD on the carrier as noted above. Namely, as data arrives for the WCD, the base station could schedule the transmission on PRBs of the PDSCH, and the base station could accordingly engage in the transmission. And as the WCD has data to transmit, the base could schedule the transmission on PRBs of the PUSCH, and the WCD could accordingly engage in the transmission.

Further, after a threshold period of time of no data communication flowing between the base station and the WCD, the base station could release the WCD's RRC connection (so that the WCD would no longer be connected with the base station) and accordingly update the WCD's context record, effectively transitioning the WCD from an RRC connected mode to an RRC idle mode. In the RRC idle mode, if data arrives for the WCD or the WCD has data communicate, the WCD would engage in a random access process to reconnect with the base station, so that the communication could proceed.

In accordance with the present disclosure as discussed above, a base station could be configured to provide service concurrently on at least two such carriers, with one carrier being defined fully within and occupying just a portion of the frequency range of the other carrier. In line with the discussion above, the wider carrier could be considered a host carrier, and the narrower carrier defined within the host carrier could be considered a guest carrier.

In practice, these two carriers could be time-aligned with each other, having the same frame timing and subframe timing as each other. Thus, each new frame of the guest carrier would start at the same time as a new frame of the host carrier starts, and each new subframe of the guest carrier would start at the same time as a new subframe of the host carrier starts. Further, both carriers could be TDD and could have the same TDD configuration as each other (such that downlink subframes of the guest carrier occur when downlink subframes of the host carrier occur, and uplink subframes of the guest carrier occur when uplink subframes of the host carrier occur) or could possibly have different TDD configurations than each other. (Alternatively, both of the carriers could be FDD could take still other forms.) Moreover, it could be possible to define more than one guest carrier within a given host carrier.

Each of these carriers could be configured respectively with the LTE channels as discussed above, with the base station being configured to provide service on both of the carriers by making use of each carrier's respective channels as noted above.

For instance, for the host carrier, the base station could be programmed to broadcast host-carrier synchronization signals in the six center PRBs of the host carrier's bandwidth so as to enable WCDs searching for the host carrier to find the host carrier and so forth as noted above. (As the host-carrier synchronization signals would be broadcast at the center of the host-carrier bandwidth, they would thus underscore that the host carrier is so centered, even though the guest carrier may also occupy a portion of the host-carrier's frequency bandwidth). Further, the base station could further be programmed to provide host-carrier PBCH, PCFICH, PDCCH, and other downlink transmissions and functionality as discussed above to facilitate downlink operation on the host carrier. And the base station could be programmed to receive WCD control signaling in the resource blocks defining the host-carrier's PUCCH, PRACH, and SRS as discussed above.

And on the guest carrier, the base station could be programmed broadcast guest-carrier synchronization signals in the six center PRBs of the guest carrier's bandwidth so as to enable WCDs searching for the guest carrier to find the guest carrier and so forth as noted above, and the base station could further be programmed to provide guest-carrier PBCH, PCFICH, PDCCH, and other downlink transmissions and functionality as discussed above to facilitate downlink operation on the guest carrier. And further, the base station could be programmed to receive WCD control signaling in the resource blocks defining the guest-carrier's PUCCH, PRACH, and SRS as discussed above.

Considering that the guest carrier will by definition use a portion of the host carrier's air interface resources with this an arrangement, it could be useful in practice to position the guest carrier in the host carrier's frequency range at a frequency position that is selected to help avoid conflict between certain key control channels of the carriers. For instance, without limitation, it could be useful to position the guest carrier such that, on the downlink, (i) each carrier's synchronization signals do not overlap with the other carrier's synchronization signals, (ii) each carrier's PCFICH does not overlap with the other carrier's PCFICH, and (iii) each carrier's PBCH does not overlap with the other carrier's PBCH. Further, it could be useful to position the guest carrier such that, on the uplink, each carrier's PUCCH does not overlap with the other carrier's PUCCH. (And as for the PRACH and SRS, similar positioning criteria could also apply, or the base station could configure the PRACH and SRS on each carrier (via the PBCH) to avoid overlaps of one carrier's PRACH or SRS with the other carrier's PRACH or SRS.) Other such criteria could exist as well.

Depending on the bandwidths at issue, various guest-carrier frequency positions within the host-carrier could meet these and/or other criteria.

Figure 2:
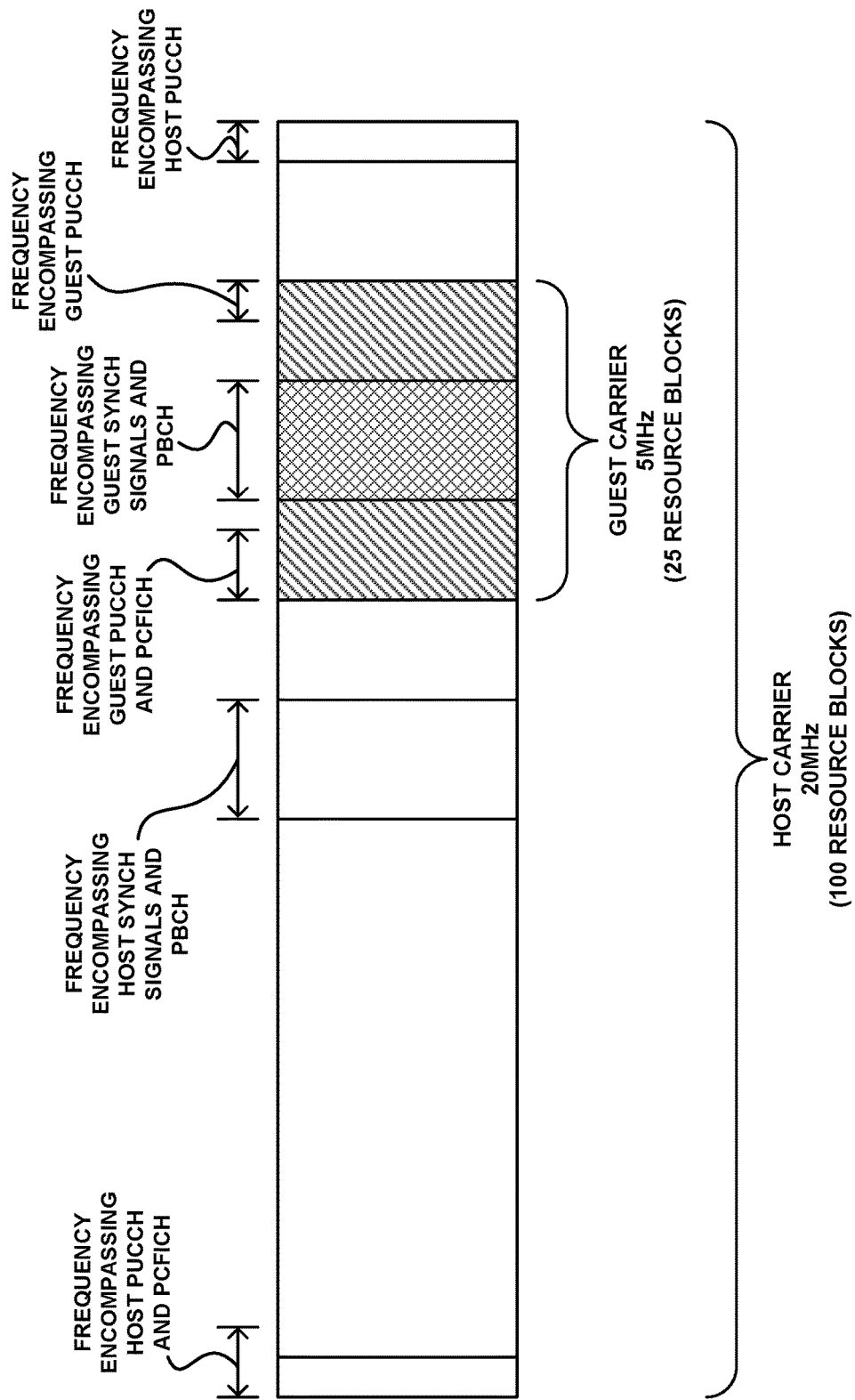
FIG. 2 is an illustration of host carrier and a guest carrier within the host carrier.

FIG. 2 depicts one example implementation (not to scale), where the host carrier has a 20 MHz frequency range and where the guest carrier has a 5 MHz frequency range. As noted above, the 20 MHz carrier could support 100 PRBs carrier wide, and the 5 MHz carrier could support 25 PRBs carrier wide. Further, in an example LTE implementation, the 20 MHz carrier would likely be TDD, and the 5 MHz carrier could be TDD as well. Alternatively, the carriers could take other forms.

FIG. 2 depicts a generalized subframe of the 20 MHz host carrier as a non-limiting example and shows some frequency portions of the host carrier that could be considered off-limits for implementing the guest carrier to help meet the example criteria noted above. In particular, as shown, portions of the host carrier's 20 MHz bandwidth that could be deemed off-limits for the guest carrier include (i) the six center PRBs, as those would be used at certain times for the host-carrier's synchronization signals and at other times for the host-carrier's PBCH, (ii) the low-end five or so resource blocks, as those would be used at certain times for the host carrier's PCFICH and the lowest end resource blocks would be used on the uplink for the host-carrier's PUCCH, and (iii) the high-end two or so resource blocks, as those would be used on the uplink for the host carrier's PUCCH.

Given these example limitations, the 5 MHz guest carrier could be positioned within the 20 MHz host carrier between these restricted areas. As one of possibly many examples, FIG. 2 shows the guest carrier being positioned in between the host-carrier's six center PRBs and the host carrier's high-end PRBs. That position would optimally avoid the overlap issues noted above and could thus work in practice.

Optimally, the guest carrier positioning within the host carrier would further be such that PRBs blocks of the guest carrier are aligned in frequency with resource blocks of the host carrier. And the base station could be configured to use the same reference-signal resource element pattern on both carriers, so that the guest-carrier resource elements that carry the guest-carrier reference signal are also host-carrier resource elements that carry a portion of the host-carrier reference signal. The base station could be so configured by setting the primary synchronization signal values on the carriers such that their modulo-3 functions would both be the same, corresponding with the same reference-signal resource element pattern for each carrier.

In effect, with this arrangement, the base station could thus be considered to be broadcasting a host-carrier reference signal on the host carrier and a guest-carrier reference signal on the guest carrier, even though the reference signals are one and the same within the guest carrier. From the perspective of WCDs, a WCD that the base station is serving on the host carrier could evaluate the host-carrier reference signal throughout the host carrier, and a WCD that the base station is serving on the guest carrier could evaluate the guest-carrier reference signal (which happens to be the same as a portion of the host-carrier reference signal) throughout the guest carrier.

In practice, with the host-carrier and guest carrier arrangement such as that shown in FIG. 2 for instance, the base station could thus provide service concurrently on the host carrier and on the guest carrier. For example, the base station could serve one or more WCDs on the host carrier while also serving one or more WCDs on the guest carrier.

In line with the discussion above, in so operating, the base station could use the host carrier for serving WCDs generally or perhaps just WCDs of a certain class, and the base station could use the guest carrier for serving WCDs of another class. The distinction between WCDs in this process could be based on various criteria. For instance, the distinction could be based on the PLMN to which each WCD subscribes. Or the distinction could be based on the device types of the WCDs. For example, as noted above, the guest carrier could be provided specifically for serving MTC devices or the like. Thus, the base station might restrict or prioritize use of the guest carrier for serving WCDs of a particular class, and the base station might allow WCDs of another class to be served on the wider host carrier.

To facilitate this in practice, WCDs subject to service on the guest carrier could be provisioned with an indication of the center frequency of the guest carrier, so that they could detect and attach with the base station on the guest carrier. And WCDs subject to service on the host carrier could be provisioned with an indication of the center frequency of the host carrier, so that they could detect and attach with the base station on the host carrier. Further, if a WCD that is subject to service on the guest carrier attaches with the base station on the host carrier, the base station could determine that the WCD is subject to service on the guest carrier (e.g., by evaluating the WCD's PLMN-ID or device type) and could redirect the WCD to connect with the base station on the guest carrier instead.

As the base station then provides service on the host carrier while also providing service on the guest carrier, the base station could make full use of the host carrier's control channels as discussed above. For instance, the base station could provide the host carrier's synchronization signals, PBCH, PCFICH, PDCCH, and cell-specific reference signal and could receive the host carrier's PUCCH, PRACH, and SRS transmissions. In scheduling shared-channel transmission on the host carrier, the base station could avoid scheduling PRBs that coincide with the shared channel of the guest carrier, restricting use of those PRBs for the guest carrier. Or the base station could prioritize use of those PRBs for the guest carrier but could allow use of those PRBs for the host carrier if and when they are not needed for guest-carrier use.

Further, as the base station provides service on the guest carrier while also providing service on the host carrier, the base station could also make full use of the guest carrier's control channels as discussed above. For instance, the base station could provide the guest carrier's synchronization signals, PBCH, PCFICH, PDCCH, and cell-specific reference signal and could receive the guest carrier's PUCCH, PRACH, and SRS transmissions.

As noted above, the present disclosure provides for dynamically adjusting the bandwidth of the guest carrier within the host carrier, based at least on a consideration of how many WCDs are connected with the base station on the host carrier. Namely, while the base station provides service on both the host carrier and the guest carrier, the guest carrier be configured with a particular bandwidth selected based at least on how many WCDs are connected with the base station on the host carrier, and the base station could dynamically change the guest carrier bandwidth based at least on a change in the number of WCDs connected with the base station on the host carrier. As a result, for some duration (some number of subframes and perhaps frames), the guest carrier defined within the host carrier could have a first bandwidth, and for a next duration (some number of subframes and perhaps frames), the guest carrier defined within the host carrier could have a second bandwidth different (e.g., wider or narrower) than the first bandwidth.

Figure 3:
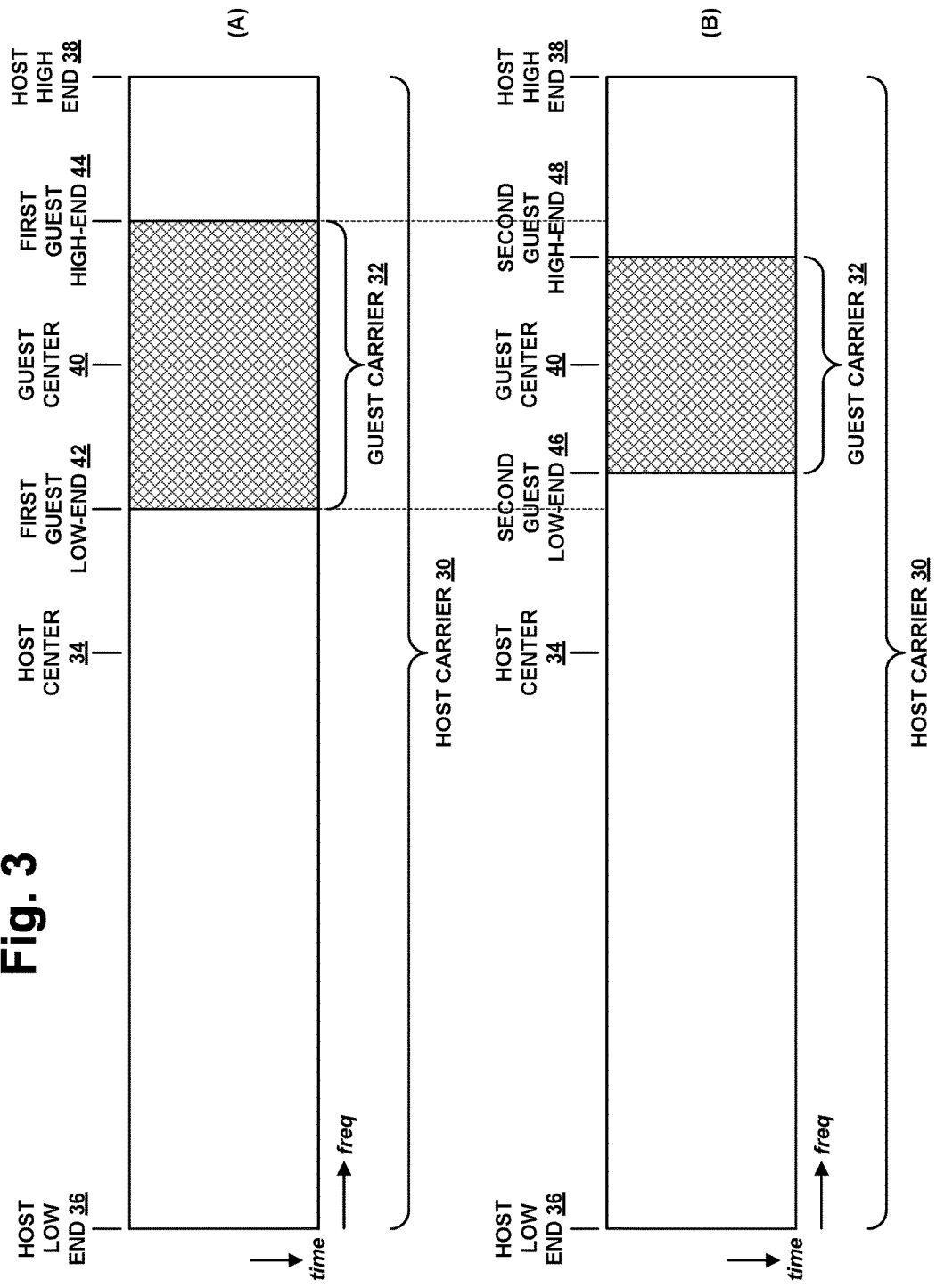
FIG. 3 is an illustration of two example subframes in which a guest carrier is defined within a host carrier, with the guest carrier having different bandwidths in the two subframes.

FIG. 3 illustrates example subframes with a representative host carrier 30 and a representative guest carrier 32 defined within the host carrier but with the guest carrier having different bandwidths in the two subframes.

Namely, FIG. 3 shows the host carrier 30 having a host-carrier center frequency 34, as a particular frequency position in the radio-frequency spectrum, and having a host-carrier frequency range that extends from a low-end frequency 36 to a high-end frequency 38, thus defining a host-carrier bandwidth as the width of the host-carrier frequency range (e.g., quantity of PRBs) between its low-end 36 and its high-end 38. And FIG. 3 shows the guest carrier 32 having a guest-carrier center frequency 40 but having a varying guest-carrier frequency range and associated bandwidth. In particular, in FIG. 3A, the guest carrier has a first guest-carrier frequency range that extends from a first low-end frequency 42 to a first high-end frequency 44, thus defining a first guest-carrier bandwidth as the width of the guest-carrier frequency range between first low-end 42 and first high-end 44. Whereas, in FIG. 3B, the guest carrier 30 has a second guest-carrier frequency range that extends from a second low-end frequency 46 to a second high-end frequency 48, thus defining a second, narrower guest-carrier bandwidth as the width of the guest-carrier frequency range between second low-end 46 and second high-end 48.

In practice, the base station could reduce the guest carrier bandwidth from that shown in FIG. 3A to that shown in FIG. 3B based at least on an increase in the number of WCDs connected with the base station on the host carrier. Or the base station could enlarge the guest carrier bandwidth from that shown in FIG. 3B to that shown in FIG. 3A based on a decrease in the number of WCDs connected with the base station on the host carrier.

In a representative implementation, the guest-carrier both before and after this change in its bandwidth could provide the various LTE channels as noted above. For instance, on the downlink, the guest carrier could provide synchronization channels, PBCH, PCFICH, PDCCH, PDSCH, and reference-signal channels, and on the uplink, the guest carrier could provide PUCCH, PUSCH, PRACH, and SRS channels. The change in bandwidth of the guest carrier might result in repositioning of one or more of these channels, but the channels would optimally be located where expected within the guest-carrier bandwidth in accordance with LTE operation as discussed above, to facilitate standard operation. To facilitate this in practice, the base station could limit how narrow it makes the guest carrier, so as to accommodate the expected LTE channels on the guest carrier.

Further, as shown in FIG. 3, the guest-carrier center frequency 40 position could remain unchanged when the base station changes the guest-carrier bandwidth, to enable WCDs that are configured to search for coverage at that center frequency to still successfully do so.

Therefore, the act of changing the bandwidth of the guest carrier could involve the base station equally expanding or equally contracting the two frequency ends of the guest carrier. Namely, to reduce the guest-carrier bandwidth, the base station could increase the guest carrier's low-end frequency by a certain extent and decrease the guest carrier's high-end frequency by the same extent. Or to enlarge the guest-carrier bandwidth, the base station could decrease the guest carrier's low-end frequency by a certain extent and increase the guest carrier's high-end frequency by the same extent. (Alternatively, when changing the guest carrier bandwidth, the base station could change the guest-carrier center frequency as well.)

In practice, to make such a change to the guest-carrier frequency range, the base station could update its records to indicate the change in bandwidth and could change the guest carrier's MIB to indicate the new bandwidth and could then operate on the guest carrier with its revised bandwidth. As noted above, the MIB specifies the carrier bandwidth as a quantity of PRBs across its bandwidth. To establish a change in guest-carrier bandwidth, the base station could thus change the quantity of PRBs specified as the carrier bandwidth in the MIB that the base station broadcasts on the guest carrier, which would define an associated new bandwidth centered on the guest-carrier center frequency.

Changing the bandwidth indication in the guest carrier's MIB would inform newly attaching WCDs of the guest-carrier's new bandwidth. Thus, when any WCD detects the guest carrier's synchronization signal and reads the guest carrier's MIB, the WCD could determine the guest-carrier bandwidth and could then operate accordingly on the guest carrier configured with that bandwidth.

As to any WCDs that were already served (in an RRC connected mode or an RRC idle mode) on the guest carrier at the time the base station changes the guest-carrier bandwidth, the base station could transmit one or more messages that inform the WCDs of the change in guest-carrier bandwidth. For instance, the base station could transmit on the PDCCH of the guest carrier a message masked with a special system-information RNTI (SI-RNTI), which could cause served WCDs to read the MIB at its next periodic occurrence so as to obtain any applicable new operational parameters. Served WCDs could thus learn of the change in the guest-carrier bandwidth and could then operate accordingly on the guest carrier configured with the new bandwidth.

Further, the base station could broadcast or unicast one or more other messages that could inform WCDs of the new guest-carrier bandwidth. For instance, the base station could provide a coded value or other indicator in another guest-carrier system information message that WCDs are configured to read, with the coded value indicating there is a new version of system information. WCDs that read this coded value could then read the next occurring instance of the MIB or other message to determine the new system information, including for instance the new guest-carrier bandwidth. Other examples are possible as well.

In line with the discussion above, the base station could change the guest-carrier bandwidth based at least on a consideration of how many WCDs are connected with the base station on the host carrier. For instance, the base station could change the guest-carrier bandwidth based at least on a consideration of how many WCDs have an RRC connection with the base station on the host carrier and are thus operating in an RRC connected mode on the host carrier.

The base station could track this number as a count of WCD context records indicating RRC connections on the host carrier. Further, at issue could be an instantaneous count of such WCDs or a statistical average (or other statistical measure) of the count of such WCDs over a sliding window basis, and/or based on historical tendencies at the current time day or the like. Evaluating the quantity of host-carrier-connected WCDs on a sliding window basis could work well in a scenario as discussed above, where the change in guest-carrier bandwidth would be indicated in a MIB and where the MIB is broadcast every 40 ms. In that scenario, for instance, the base station could determine a recent average count of host-carrier-connected WCDs per unit time just before each MIB broadcast and, based at least on that count could determine and set a guest-carrier bandwidth and specify the guest-carrier bandwidth in the upcoming guest-carrier MIB broadcast.

In practice, the base station could apply logic, such as a reference table and/or program instructions, that correlates particular quantities of host-carrier-connected WCDs with respective guest-carrier bandwidths. Such logic could inversely relate quantity of host-carrier-connected WCDs with guest-carrier bandwidths. In particular, the logic could correlate wider guest-carrier bandwidths with lower quantities of host-carrier-connected WCDs and could correlate narrower guest-carrier bandwidths with higher quantities of host-carrier-connected WCDs. The specific correlations could be a matter of design choice.

Thus, when the base station determines the quantity of WCDs connected with the base station on the host carrier, the base station could apply such logic to determine a corresponding guest-carrier bandwidth to configure, and, assuming a change is to be made, the base station could then reconfigure the guest carrier accordingly. Further, as the quantity of WCDs connected with the base station on the host carrier changes, the base station could repeat this process.

Further, in another example implementation, the base station could change the guest-carrier bandwidth in response to a threshold change in the number of WCDs connected with the base station on the host carrier. For instance, the base station could reduce the guest-carrier bandwidth in response to a threshold increase (e.g., threshold rate of increase and/or threshold quantity of increase) in the number of host-carrier-connected WCDs or to an increase in the number of host-carrier-connected WCDs up to a threshold level. And the base station could enlarge the guest-carrier bandwidth in response to a threshold decrease (e.g., threshold rate of decrease and/or threshold quantity of decrease) in the number of host-carrier-connected WCDs or to a decrease in the number of host-carrier-connected WCDs down to a threshold level.

Note also that the base station could take into consideration additional factors as a further basis for deciding what the guest-carrier bandwidth should be. For example, the base station could additional factor in the number of WCDs connected with the base station on the guest carrier, as well as one or more other metrics.

Figure 4:
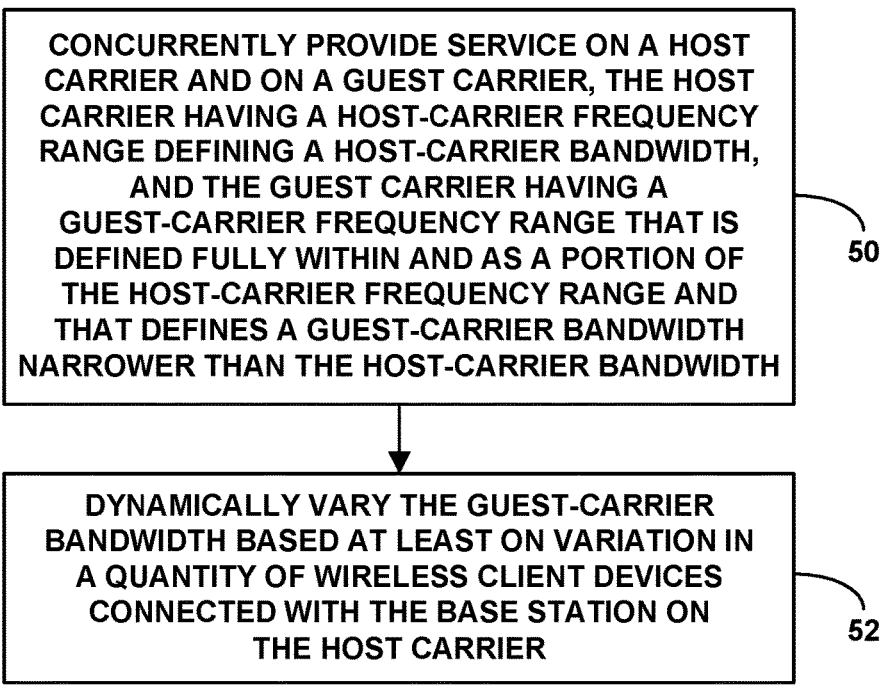
FIG. 4 is a flow chart depicting example operations in accordance with the disclosure.

FIG. 4 is next a flow chart depicting operations that could be carried out in accordance with an example method, to provide cellular wireless service on a guest carrier and a host carrier. As shown in FIG. 4, at block 50, the method involves the base station concurrently (i) providing service on the host carrier and (ii) providing service on the guest carrier, the host carrier having a host-carrier frequency range defining a host-carrier bandwidth, and the guest carrier having a guest-carrier frequency range that is defined fully within and as a portion of the host-carrier frequency range and that defines a guest-carrier bandwidth narrower than the host-carrier bandwidth. And at block 52, the method involves the base station dynamically varying the guest-carrier bandwidth, with the dynamically varying being based at least on variation in a quantity of wireless client devices connected with the base station on the host carrier.

In line with the discussion above, in this process, the act of dynamically varying the guest-carrier bandwidth based at least on variation in the quantity of wireless client devices connected with the base station on the host carrier could involve (i) reducing the guest-carrier bandwidth based at least on an increase in the quantity of wireless client devices connected with the base station on the host carrier or (ii) enlarging the guest-carrier bandwidth based at least on a decrease in the quantity of wireless client devices connected with the base station on the host carrier. As such, the dynamic varying could involve monitoring the quantity of wireless client devices connected with the base station (e.g., each having an RRC connection with the base station) on the host carrier, possibly over a sliding window of time or other basis, with the dynamic varying being based at least on the monitoring.

Further, the act of dynamically varying the guest-carrier bandwidth could involve changing the guest-carrier bandwidth from a first bandwidth to a second bandwidth different than the first bandwidth, and broadcasting on the guest carrier a message that specifies the second guest-carrier bandwidth, as a notification on the guest carrier that the guest carrier now has the second bandwidth. For instance, as discussed above, the broadcast message could be a master information block (MIB) on a physical broadcast channel (PBCH) of the guest carrier.

In addition, as discussed above, a center frequency of the guest carrier could be at a particular frequency position within the host-carrier frequency range, and the method could include keeping the center frequency of the guest carrier at that frequency position within the host-carrier frequency range when varying the bandwidth of the guest carrier. For instance, the method could include equally increasing the low end and decreasing the high end, or equally decreasing the low end and increasing the high end.

Further, the act of providing service on the host carrier could involve providing the service on the host carrier using a frame structure that defines a continuum of frames each having subframes, and the act of providing service on the guest carrier could involve providing the service on the guest carrier using the same frame structure, with frames of the service on the host carrier being time-aligned with frames of the service on the guest carrier, and with subframes of the service on the host carrier being time-aligned with subframes of the service on the guest carrier. For instance, the host carrier and guest carrier could both be TDD carriers, using a common (same) TDD frame configuration, in which case downlink subframes of the host carrier could be time-aligned with downlink subframes of the guest carrier and uplink subframes of the host carrier could be time-aligned with uplink subframes of the guest carrier.

And still further, each subframe on the host carrier could be divided into air interface resources, in which case providing service by the base station on the guest carrier concurrently with providing service by the base station on the host carrier could involve prioritizing a portion of the air interface resources per subframe for use as a guest-carrier shared channel but allowing use of the portion of the air interface resources per subframe for a host-carrier shared channel.

Figure 5:
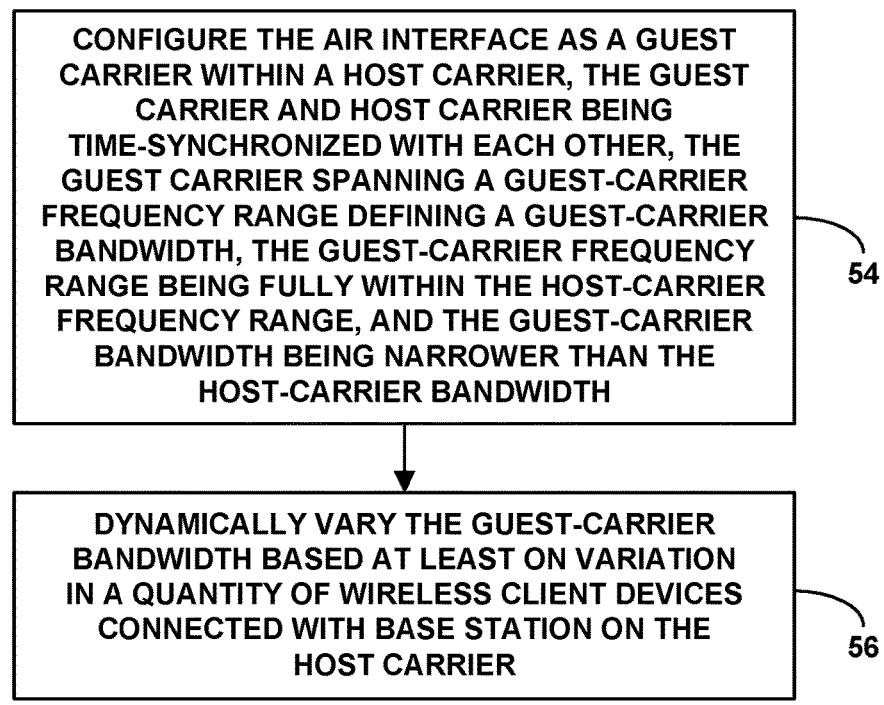
FIG. 5 is another flow chart depicting example operations in accordance with the disclosure.

FIG. 5 is next a flow chart depicting operations that could be carried out in accordance with an example method, to configure an air interface for communication between a base station and wireless client devices, where the base station provides service on a host carrier, the host carrier spanning a host-carrier frequency range defining a host-carrier bandwidth. As with the method of FIG. 4, the operations of this method could be carried out by a base station as described above. Alternatively, the method operations could be carried out by one or more other entities, perhaps on behalf of the base station.

As shown in FIG. 5, at block 54, the method includes configuring the air interface as a guest carrier within the host carrier, the guest carrier and host carrier being time-synchronized with each other, the guest carrier spanning a guest-carrier frequency range defining a guest-carrier bandwidth, the guest-carrier frequency range being fully within the host-carrier frequency range, and the guest-carrier bandwidth being narrower than the host-carrier bandwidth. And at block 56, the method includes dynamically varying the guest-carrier bandwidth based at least on variation in a quantity of wireless client devices connected with the base station on the host carrier.

Features discussed above could be applied in this context as well, and vice versa. For example, the act of dynamically varying the guest-carrier bandwidth based at least on variation in the quantity of wireless client devices connected with the base station on the host carrier could involve reducing the guest-carrier bandwidth based at least on an increase in the quantity of client devices connected with the base station on the host carrier or enlarging the guest-carrier bandwidth based at least on a decrease in the quantity of client devices connected with the base station on the host carrier. And the act of dynamically varying the guest-carrier bandwidth could involve changing the guest-carrier bandwidth from a first bandwidth to a second bandwidth different than the first bandwidth, and broadcasting on the guest carrier a message specifying the second guest-carrier bandwidth as notification on the guest carrier that the guest carrier now has the second bandwidth.

Figure 6:
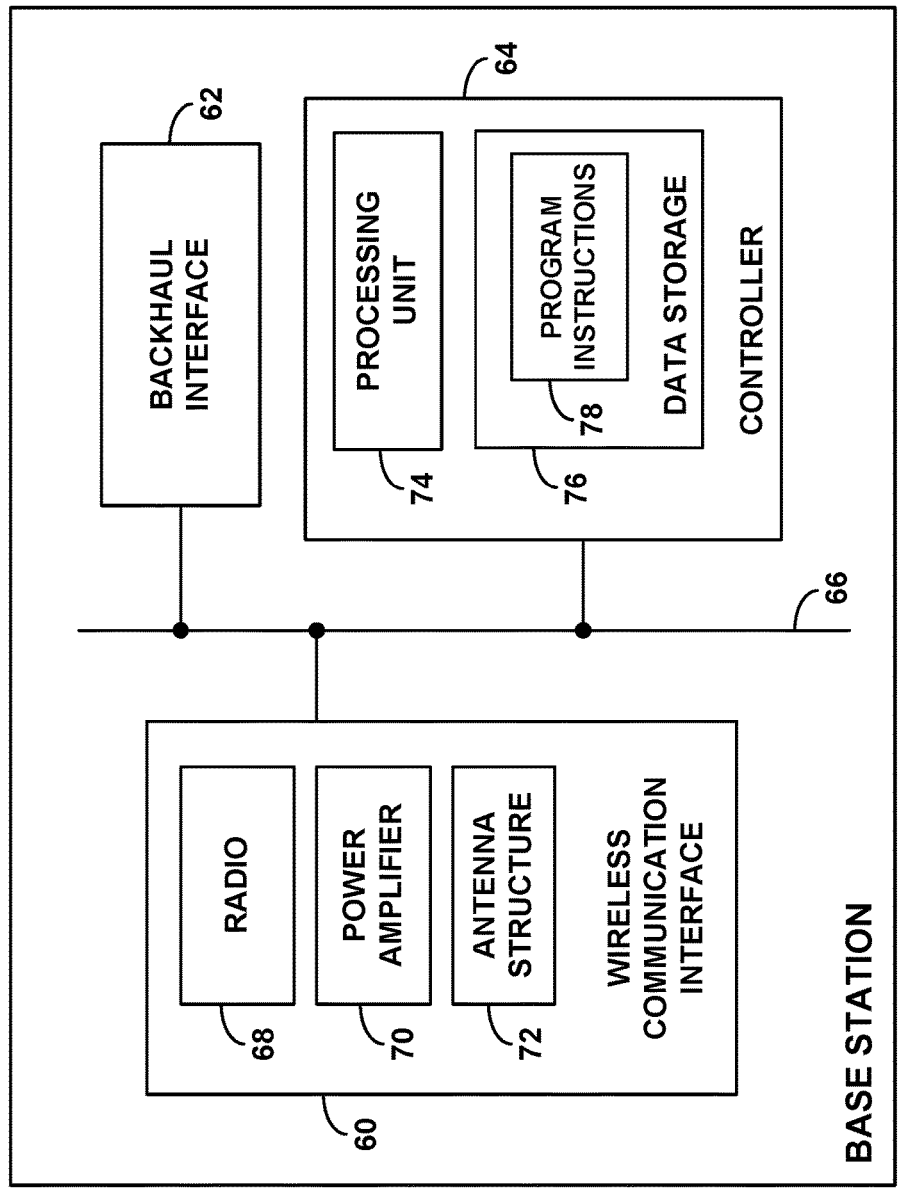
FIG. 6 is a simplified block diagram of a base station that could operate in accordance with the disclosure.

Finally, FIG. 6 is a simplified block diagram of an example base station that could be configured to provide service on a host carrier and on a guest carrier within the host carrier, where the host carrier has a host-carrier frequency range, and where the guest carrier has a guest-carrier frequency range that is narrower than the host-carrier frequency range and that occupies a portion of the host-carrier frequency range and is fully encompassed by the host-carrier frequency range. Generally speaking, this base station could take any of a variety of forms, such as a macro base station, a small cell (e.g., femtocell) base station, a relay base station, or the like.

As shown in FIG. 6, the base station includes a wireless communication interface 60, a backhaul interface 62, and a controller 64, all of which could be integrated together in various ways or interconnected by a system bus, network, or other connection mechanism 66.

The wireless communication interface 60 could include a radio 68, a power amplifier 70, and an antenna structure 72, cooperatively enabling the base station to provide a host carrier and guest carrier as discussed above and to transmit and receive air interface communication on the host carrier and on the guest carrier, so as to concurrently provide service on the host carrier and on the guest carrier. The backhaul interface 62 could comprise a network port through which the base station could be interconnected with other network entities, such as the MME and SGW as noted above.

And the controller 64 could comprise a processing unit 74 (e.g., one or more microprocessors), non-transitory data storage 76 (e.g., one or more volatile and/or non-volatile storage components), and program instructions 78 (e.g., machine language instructions) stored in the data storage 76 and executable by the processing unit 74 to carry out various base station operations described herein. For instance, the controller could be configured to dynamically vary (e.g., to cause the base station to dynamically vary) a bandwidth of the guest carrier within the host carrier based at least on variation in a quantity of wireless client devices connected with the base station on the host carrier.

Various operational features discussed above could then be incorporated in this base station. For instance, the act of dynamically varying the bandwidth of the guest carrier based at least on variation in the quantity of wireless client devices connected with the base station on the host carrier could involve reducing the guest-carrier bandwidth based at least on an increase in the quantity of client devices connected with the base station on the host carrier and/or enlarging the guest-carrier bandwidth based at least on a decrease in the quantity of client devices connected with the base station on the host carrier.

And the controller could be configured to dynamically vary the bandwidth of the guest carrier by carrying out operations such as changing the guest-carrier bandwidth from a first bandwidth to a second bandwidth different than the first bandwidth and causing the wireless communication interface to broadcast on the guest carrier a message specifying the second guest-carrier bandwidth, as a notification on the guest carrier that the guest carrier now has the second bandwidth. For example, the controller could generate a revised MIB specifying the new guest-carrier bandwidth and could provide the MIB to the wireless communication interface for broadcast in the PBCH of the guest carrier as discussed above.

Exemplary embodiments have been described above. Those skilled in the art will understand, however, that changes and modifications may be made to these embodiments without departing from the true scope and spirit of the invention. Further, various features described above with respect to certain embodiments could be implemented in other embodiments described above as well.

We claim:

1. A method for a base station to provide cellular wireless service on a guest carrier and a host carrier, the method comprising:
   providing service by the base station on the host carrier, wherein the host carrier has a host-carrier radio-frequency range defining a host-carrier bandwidth, wherein the host-carrier bandwidth is how wide in radio-frequency the host-carrier radio-frequency range is;
   providing service by the base station on the guest carrier concurrently with providing service by the base station on the host carrier, wherein the guest carrier has a guest-carrier radio-frequency range that is defined fully within and as a portion of the host-carrier radio-frequency range and that defines a guest-carrier bandwidth narrower than the host-carrier bandwidth, wherein the guest-carrier bandwidth is how wide in radio-frequency the guest-carrier radio-frequency range is; and
   dynamically varying by the base station the guest-carrier bandwidth, wherein the dynamically varying is based at least on variation in a quantity of client devices connected with the base station on the host carrier.

2. The method of claim 1, wherein dynamically varying by the base station the guest-carrier bandwidth based at least on variation in the quantity of client devices connected with the base station on the host carrier comprises at least one operation selected from the group consisting of:
   reducing the guest-carrier bandwidth based at least on an increase in the quantity of client devices connected with the base station on the host carrier, and
   enlarging the guest-carrier bandwidth based at least on a decrease in the quantity of client devices connected with the base station on the host carrier.

3. The method of claim 1, wherein dynamically varying by the base station the guest-carrier bandwidth comprises:
   changing by the base station the guest-carrier bandwidth from a first bandwidth to a second bandwidth different than the first bandwidth; and
   broadcasting by the base station on the guest carrier a message specifying the second guest-carrier bandwidth as notification on the guest carrier that the guest carrier now has the second bandwidth.

4. The method of claim 3, wherein the message is a master information block (MIB) on a physical broadcast channel (PBCH) of the guest carrier.

5. The method of claim 1, wherein dynamically varying by the base station the guest-carrier bandwidth based at least on variation in the quantity of client devices connected with the base station on the host carrier comprises:
   monitoring by the base station the quantity of client devices connected with the base station on the host carrier, wherein the dynamic varying is based at least on the monitoring.

6. The method of claim 5, wherein monitoring by the base station the quantity of client devices connected with the base station on the host carrier comprises determining by the base station the quantity over a sliding window of time.

7. The method of claim 1, wherein the quantity of client devices connected with the base station on the host carrier is a quantity of client devices each having a Radio Resource Control (RRC) connection with the base station on the host carrier.

8. The method of claim 1, wherein a center frequency of the guest carrier is at a frequency position within the host-carrier radio-frequency range,
   the method further comprising keeping the center frequency of the guest carrier at the frequency position within the host-carrier radio-frequency range when varying the bandwidth of the guest carrier.

9. The method of claim 8, wherein the guest carrier radio-frequency range extends from a low end to a high end, and wherein varying the guest-carrier bandwidth comprises an operation selected from the group consisting of:
   equally increasing the low end and decreasing the high end, and
   equally decreasing the low end and increasing the high end.

10. The method of claim 1,
    wherein providing service on the host carrier comprises providing the service on the host carrier using a frame structure that defines a continuum of frames each having subframes, and
    wherein providing service on the guest carrier comprises providing the service on the guest carrier using the same frame structure, wherein frames of the service on the host carrier are time-aligned with frames of the service on the guest carrier, and wherein subframes of the service on the host carrier are time-aligned with subframes of the service on the guest carrier.

11. The method of claim 10, wherein the host carrier and guest carrier are both time division duplex (TDD) and both use a common TDD frame configuration,
    whereby downlink subframes of the host carrier are time-aligned with downlink subframes of the guest carrier, and uplink subframes of the host carrier are time-aligned with uplink subframes of the guest carrier.

12. The method of claim 10,
    wherein each subframe on the host carrier is divided into air interface resources, and
    wherein providing service by the base station on the guest carrier concurrently with providing service by the base station on the host carrier comprises prioritizing a portion of the air interface resources per subframe for use as a guest-carrier shared channel but allowing use of the portion of the air interface resources per subframe for a host-carrier shared channel.

13. A method of configuring an air interface for communication between a base station and wireless client devices, the method comprising:
   configuring the air interface as a guest carrier within a host carrier, wherein the base station provides service on the host carrier, wherein the host carrier spans a host-carrier radio-frequency range defining a host-carrier bandwidth, wherein the host-carrier bandwidth is how wide in radio-frequency the host-carrier radio-frequency range is, wherein the guest carrier and host carrier are time-synchronized with each other, wherein the guest carrier spans a guest-carrier radio-frequency range defining a guest-carrier bandwidth, wherein the guest-carrier bandwidth is how wide in radio-frequency the guest-carrier radio-frequency range is, wherein the guest-carrier radio-frequency range is fully within the host-carrier radio-frequency range, and wherein the guest-carrier bandwidth is narrower than the host-carrier bandwidth; and dynamically varying the guest-carrier bandwidth based at least on variation in a quantity of wireless client devices connected with the base station on the host carrier.

14. The method of claim 13, wherein dynamically varying the guest-carrier bandwidth based at least on variation in the quantity of wireless client devices connected with the base station on the host carrier comprises at least one operation selected from the group consisting of:

reducing the guest-carrier bandwidth based at least on an increase in the quantity of client devices connected with the base station on the host carrier, and enlarging the guest-carrier bandwidth based at least on a decrease in the quantity of client devices connected with the base station on the host carrier.

15. The method of claim 13, wherein dynamically varying the guest-carrier bandwidth comprises:

changing the guest-carrier bandwidth from a first bandwidth to a second bandwidth different than the first bandwidth, and broadcasting on the guest carrier a message specifying the second guest-carrier bandwidth as notification on the guest carrier that the guest carrier now has the second bandwidth.

16. The method of claim 13, carried out by the base station.

17. A base station configured to provide service on a host carrier and on a guest carrier within the host carrier, the base station comprising:

a wireless communication interface, comprising a radio and an antenna structure, configured to transmit and receive air interface communication on the host carrier and on the guest carrier, wherein the host carrier has a host-carrier radio-frequency range, and wherein the guest carrier has a guest-carrier radio-frequency range that is narrower than the host-carrier radio-frequency range and that occupies a portion of the host-carrier radio-frequency range and is fully encompassed by the host-carrier radio-frequency range; and a controller configured to dynamically vary a bandwidth of the guest carrier within the host carrier based at least on variation in a quantity of wireless client devices connected with the base station on the host carrier, wherein the bandwidth of the guest carrier is how wide in radio-frequency the guest-carrier radio-frequency range is.

18. The base station of claim 17, wherein the controller comprises a processing unit, non-transitory data storage, and program instructions stored in the data storage and executable by the processing unit.

19. The base station of claim 17, wherein dynamically varying the bandwidth of the guest carrier based at least on variation in the quantity of wireless client devices connected with the base station on the host carrier comprises at least one operation selected from the group consisting of:

reducing the guest-carrier bandwidth based at least on an increase in the quantity of client devices connected with the base station on the host carrier; and enlarging the guest-carrier bandwidth based at least on a decrease in the quantity of client devices connected with the base station on the host carrier.

20. The base station of claim 17, wherein the controller is configured to dynamically vary the bandwidth of the guest carrier by carrying out operations comprising:

changing the guest-carrier bandwidth from a first bandwidth to a second bandwidth different than the first bandwidth; and causing the wireless communication interface to broadcast on the guest carrier a message specifying the second guest-carrier bandwidth, as a notification on the guest carrier that the guest carrier now has the second bandwidth.

* * * * *